United States Patent [19]

Burkel et al.

[11] Patent Number: 4,612,845
[45] Date of Patent: Sep. 23, 1986

[54] ELECTROMAGNETICALLY OPERATED DUAL-VALVE FLOW-CONTROL ASSEMBLY

[75] Inventors: Rainer Burkel, Asperg; Peter Zieher, Eberdingen, both of Fed. Rep. of Germany

[73] Assignee: Robert Bosch GmbH, Stuttgart, Fed. Rep. of Germany

[21] Appl. No.: 684,907

[22] Filed: Dec. 21, 1984

[30] Foreign Application Priority Data

Jan. 23, 1984 [DE] Fed. Rep. of Germany ....... 3402118

[51] Int. Cl.⁴ .......................................... F15B 13/044
[52] U.S. Cl. ....................................... 91/448; 91/459; 137/1; 137/613; 137/624.2; 251/65
[58] Field of Search .................. 91/448, 459; 137/596.17, 624.2, 613, 1; 251/65

[56] References Cited

U.S. PATENT DOCUMENTS

| | | | |
|---|---|---|---|
| 1,965,053 | 7/1934 | Powers | 137/613 |
| 2,308,261 | 1/1943 | Bartlett et al. | 91/448 X |
| 2,891,577 | 6/1959 | Stewart | 137/613 X |
| 4,390,188 | 6/1983 | Rouse | 91/448 X |
| 4,506,701 | 3/1985 | Masaki et al. | 251/65 X |

FOREIGN PATENT DOCUMENTS 64643 4/1982 European Pat. Off. ........... 137/613

Primary Examiner—Gerald A. Michalsky
Attorney, Agent, or Firm—Michael J. Striker

[57] ABSTRACT

A valve assembly for controlling fluid flow between a fluid source and a load has an intake valve having a valve body displaceable between a closed position preventing flow through the intake valve and an open position permitting such flow and an output valve having a valve body displaceable between a closed position preventing flow through the output valve and an open position permitting such flow. Conduits or passages connect the valves in series between the load and the source so that fluid can only flow between the load and source when both of the valves are in their open positions. Respective biasing units urge each of the valves into one of its positions and respective electromagnet-type actuators are electrically energizable to move each valve into the other of its positions. The one position of one of the valves is the closed position and the one position of the other valve is the open position. In addition the two valves are substantially identical. As a result the response times of these two valves will be identical also and will change identically with time or temperature, since substantially the same flow is traversing both valves.

11 Claims, 7 Drawing Figures

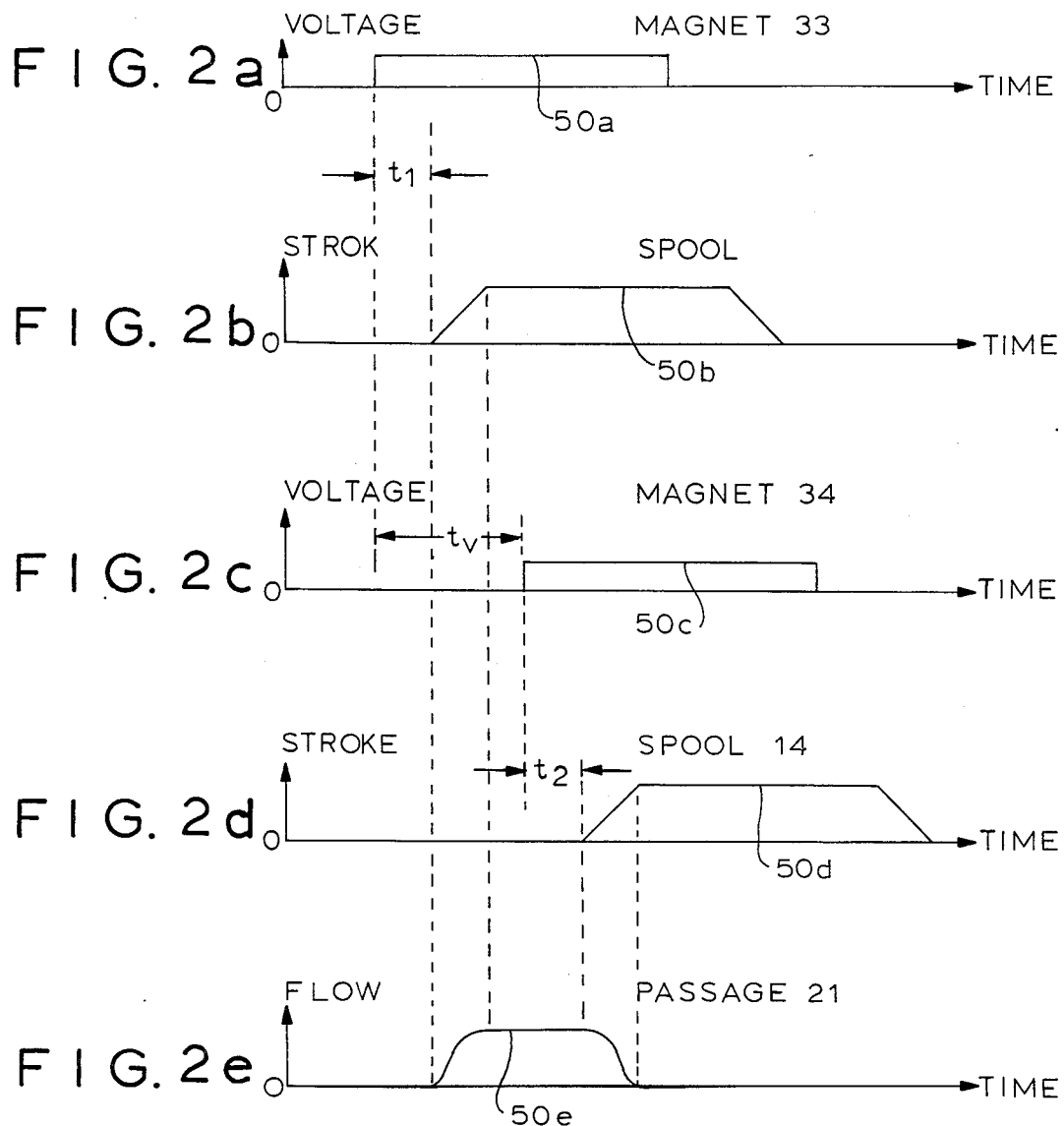
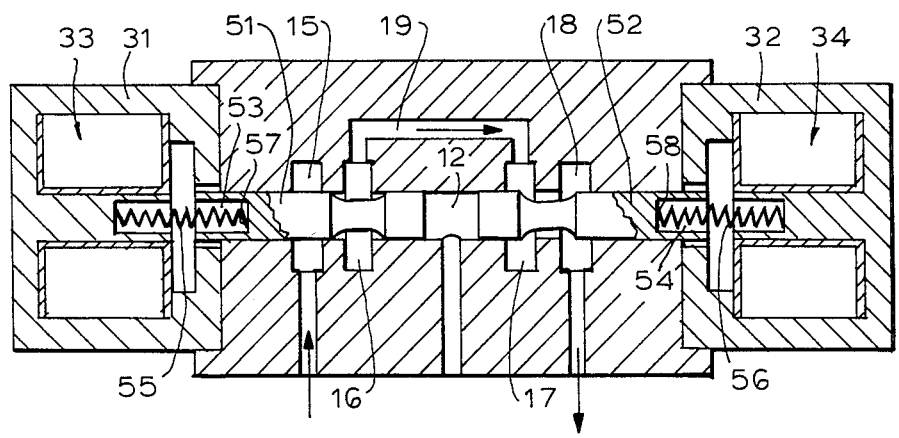

ELECTROMAGNETICALLY OPERATED DUAL-VALVE FLOW-CONTROL ASSEMBLY

FIELD OF THE INVENTION

The present invention relates to a dual flow-control valve assembly. More particularly this invention concerns an electromagnetically controlled valve assembly.

BACKGROUND OF THE INVENTION

A standard flow-control assembly has two valves connected in series and operated by respective electromagnets to control flow between a source and a load. Each valve has a spool or slider carrying the core of the solenoid. For maximum resistance to pressure both electromagnets must be electrically energized for flow between the load and the source.

One of the disadvantages of this type of arrangement is in its slow and varying response time. The heavy valve body moves sluggishly, so that there is a lag between application of voltage to the respective coil and the start of movement of the valve body and another lag when the coil is deenergized and the field collapses. This lag is due to the time it takes the magnetic field to build up or decay, the inertia of the valve body, the friction between this body and the valve housing, and numerous other factors. In addition as the valve ages the response time varies due to erosion of the control surfaces, wear of the sliding surfaces, leakage and so on. What is more, the response time also varies with temperature and viscosity of the fluid being controlled, as well as with pressure and other characteristics.

This variable and sluggish response time is therefore impossible to predict accurately, and estimating it is complicated further by the fact that two such valves must taken into account. As a result such a valve assembly cannot accurately dose the fluid it controls.

OBJECTS OF THE INVENTION

It is therefore an object of the present invention to provide an improved valve assembly.

Another object is the provision of such a valve assembly which overcomes the above-given disadvantages, that is which can accurately dose a fluid generally without respect to the various factors that affect response time of prior-art such valve assemblies.

SUMMARY OF THE INVENTION

A valve assembly for controlling fluid flow between a fluid source and a load according to the invention has an intake valve having a valve body displaceable between a closed position preventing flow through the intake valve and an open position permitting such flow and an output valve having a valve body displaceable between a closed position preventing flow through the output valve and an open position permitting such flow. Conduits or passages connect the valves in series between the load and the source so that fluid can only flow between the load and source when both of the valves are in their open positions. Respective biasing units urge each of the valves into one of its positions and respective electromagnet-type actuators are electrically energizable to move each valve into the other of its positions.

The valves of this invention can be slider or spool valves or seat-type valves. In the former case the valve bodies are slidable between their positions along a common axis.

In addition according to this invention the one position of one of the valves is the closed position and the one position of the other valve is the open position. Furthermore the two valves are substantially identical. As a result the response times of these two valves will be identical also and will change identically with time or temperature, since substantially the same flow is traversing both valves. Thus it is possible in accordance with this invention to operate the system for a predetermined open or flow time by energizing the normally closed valve with a direct-current voltage pulse and and for thereafter energizing the normally open valve with another direct-current pulse whose leading flank follows the first pulse by the desired flow time. Since the response time for opening and for closing of the valves, in particular spool valves, will be identical, the open time will correspond to the time between the starts of the two energizing voltage pulses. Thus, for example, in extremely cold conditions when the fluid is viscous the response times for both valves will be quite long, but the overall open time for the valve assembly will be accurate, even if this open time is somewhat later than the energization time.

According to another feature of this invention the biasing units include respective permanent magnets carried on the intake and output valve bodies and respective magnetically attractable elements on the valves for urging each of the valves into one of its positions. The electromagnets of the actuators are juxtaposed with each permanent magnet and electrically energizable to repel the respective permanent magnet and displace the respective valve body into the other of its positions. Such magnetic biasing is extremely reliable, simple, and insensitive to ambient conditions.

It is also possible in accordance with the invention to make the valve bodies at least partially magnetically attractable and to use springs as the biasing units. Thus the electromagnets act directly on the valve bodies, making it possible for them to be relatively light.

DESCRIPTION OF THE DRAWING

The above and other features and advantages will become more readily apparent from the following, it being understood that any feature described with reference to one embodiment of the invention can be used where possible with any other embodiment. In the accompanying drawing:

FIGS. 2a, 2b, 2c, 2d, and 2e are time-base graphs illustrating operation of the valve assembly of the present invention; and FIG. 3 is an axial section through another valve assembly according to the invention.

SPECIFIC DESCRIPTION

Figure 1:
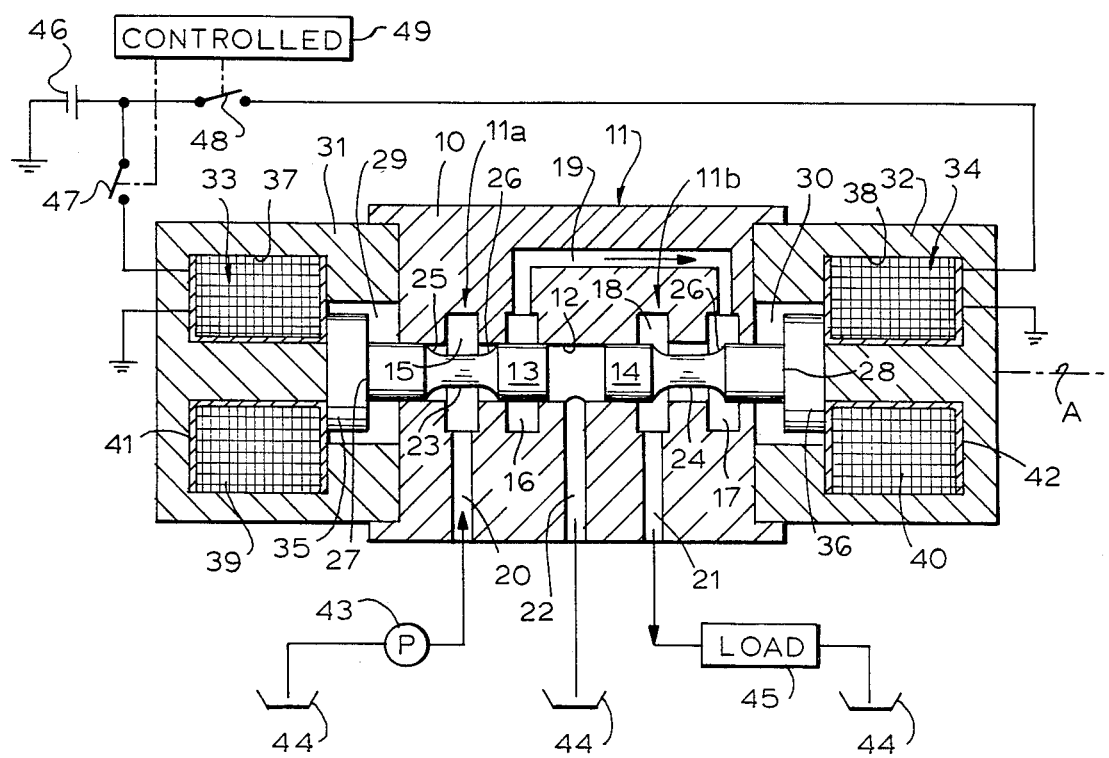
FIG. 1 is a partly diagrammatic axial section through the valve assembly according to this invention.

As seen in FIG. 1 a valve assembly 11 according to this invention has a housing 10 formed with a cylindrical chamber or bore 12 centered on an axis A. Four circumferential grooves or annular compartments 15, 16, 17, and 18 are formed in the housing 10 opening into the bore 12 with the compartments 15 and 17 axially outside the compartments 16 and 18. Two identical valve bodies or spools 13 and 14 are axially slidable in the bore 12 and have central radially outwardly open grooves 23 and 24 defining respective outer control edges 25 and 26. The spool 13 in the illustrated outer or closed position prevents fluid flow between the compartments 15 and 16 and in an inner open position to the right thereof permits such flow. Oppositely, the spool 14 in the illustrated outer open position permits fluid flow between the compartments 17 and 18 and in an inner closed position to the left thereof prevents such flow. The spool 13 and its compartments 15 and 16 therefore form an upstream valve 11a and the spool 14 with its compartments 17 and 18 a downstream valve 11b in series therewith between a pump 43 and load 45.

A passage 20 opens radially into the end compartment 15 and is connected to the high-pressure side of the pump 43 whose low-pressure side is connected to a sump 44. Another passage 21 opens radially into the compartment 18 and is connected to the fluid-operated load 45 such as a single-acting hydraulic ram, which may also be connected to the sump 44. In addition a passage 19 interconnects the compartments 16 and 17 and the space in the chamber 12 between the inner ends of the spools 13 and 14 is connected via a passage 22 to the atmosphere or also to the sump 44. Thus if either of the spools 13 or 14 is in the closed position flow from the intake passage 20 to the output passage 21 will be interrupted.

The identical spools 13 and 14 are made of aluminum or the like so as not to be magnetically attractable and have outer ends 27 and 28 that carry identical axially polarized permanent magnets 35 and 36. Coil housings 31 and 32 fixed to the opposite axial ends of the housing 10 have identical recesses 29 and 30 in which the magnets 35 and 36 are axially displaceable as the respective spools 13 and 14 move between their inner and outer positions. These housings 31 and 32 also have respective electromagnets 33 and 34 formed by respective windings 39 and 40 and ferromagnetic cores 37 and 38. These coils 39 and 40 can be energized from a direct-current power supply 46 through respective switches 47 and 48 under the command of a controller 49. The relative polarities of the permanent magnets 35 and 36 and the respective electromagnets 33 and 34 are such that when these electromagnets 33 and 34 are energized they repel the respective permanent magnets 35 and 36 and push the valve spools 13 and 14 axially inward into the respective open and closed positions.

The valve assembly 11 described immediately above functions as follows:

When completely deenergized the valve assembly 11a assumes the illustrated position with the valve 11a closed and the valve 11b open. These positions are maintained by attraction of the respective magnets 35 and 36 to the respective cores 41 and 42.

To open the assembly 11 a voltage pulse is applied to the electromagnet 33 to open the valve 11a. FIG. 2a shows the voltage applied to the magnet 33 plotted on the ordinance against time on the abscissa to produce a curve 50a and FIG. 2b shows the stroke of the respective spool 13 in units of length similarly plotted against the same time to produce a curve 50b. Thus there is a short response time $t_1$ between the application of the voltage to the coil 33, which can normally be presumed to be cotemporaneous with the actuation of the switch 47, and when the first valve 11 opens. This response time $t_1$ is a function of the size of the spool 13, force of the magnets 35 and 33, friction in the bore 12, pressure being controlled, and a host of other factors as mentioned above.

Thereafter as shown in FIGS. 2c and 2d which respectively plot the curves and 50c and 50d for the electrical energization and stroke of the spool 14 like FIGS. 2a and 2b, the valve 11b is actuated with the electrical energization starting an interval $t_v$ of time after the onset of electrical energization of the valve 11a. The valve 11b responds and starts to close a response time $t_2$ after its magnet 34 is energized.

The valve 11a is deenergized only well after the valve 11b is energized as can be seen in FIGS. 2a–2d. Such deenergization of the valve 11a, which must follow the energization of the valve 11b by at least $t_1$, closes this valve 11a since it is biased into the illustrated closed position by attraction of its magnet 35 to the ferromagnetic core 41. This closing of the valve 11a after the valve 11b is closed will obviously have no effect on the system. Subsequent deenergization of the valve 11b, which once again must not precede deenergization of the valve 11a, opens this valve 11b, which will have no effect on the system since the valve 11a is already closed.

Thus as shown in FIG. 2e, where flow through the system is plotted on the ordinate against time on the abscissa to produce a curve 50e, the open time of the valve assembly will correspond to the interval $t_v$. This open time will indeed follow the actual start of the actuation time, but will always be of the same length. As a result flow through this valve assembly 11 will be a direct function of its electrical actuation with regard to time.

More particularly, the controller 49 is set to send out the voltage pulse that energizes the magnet 34 and closes the valve 11b at an adjustable amount of time after it initiates the pulse that opens the valve 11a. The length of the interval $t_v$ between the start of the pulse illustrated by the curve 50a and that illustrated by the curve 50c can be easily controlled by a very simple time-delay circuit of conventional design so that the open time of the valve assembly 11 can be very easily regulated.

Since the body 13, the permanent magnet 35, and the electromagnet 33 as well as other reaction-affecting factors are identical to the body 14, the permanent magnet 36, and the electromagnet 34, the response time $t_2$ will be identical to the response time $t_1$. In addition since the two substantially identical valves 11a and 11b can be expected to wear at substantially the same rate because they are subjected to substantially the same flow, these two response times $t_1$ and $t_2$ will also change with time at the same rate. Furthermore, even though the response times $t_1$ and $t_2$ will be much longer when a liquid passing through the assembly 11 is more viscous, as in cold weather, the open time of the valve will be the same.

FIG. 3 shows an arrangement which functions identically to that of FIG. 1. Here, however two spools 51 and 2 are provided which themselves are ferromagnetic. They are formed at their outer ends with outwardly open recesses 53 and 4 in which are received the inner ends of respective compression springs 55 and 56 having outer ends braced against the coils 33 and 34. In addition in this arrangement the compartments 15 and 18 are connected respectively to the source and load, and the compartments 16 and 17 are connected together by the passage 19.

With the FIG. 3 system the electromagnets 33 and 34 are energized to pull the spools 51 and 52 respectively into the open and closed positions, and the springs 55 and 56 bias them back into the closed and open positions, respectively.

It would be possible to separate the two valves of either valve assembly and to even dimension them somewhat differently so long as their response times were identical. It is merely critical that the two response times be identical, that the one valve be normally open and the other normally closed, and that the first actuated valve not be deactivated until well after actuation of the second valve.

We claim:

1. A valve assembly for controlling fluid flow between a fluid source and a load, the assembly comprising:
   an intake valve having
      a valve body displaceable between a closed position preventing flow through the intake valve and an open position permitting such flow, and
      a electromagnet electrically energizable to move the valve body between its positions;
   an output valve having
      a valve body movable independently of the valve body of the intake valve and displaceable between a closed position preventing flow through the output valve and an open position permitting such flow, and
      an electromagnet independent of the electromagnet of the intake valve and energizable to move the valve body of the output valve between its positions;
   conduit means for connecting the valves in series between the load and the source, whereby fluid can only flow between the load and source when both of the valves are in their open positions;
   biasing means including respective permanent magnets carried on the intake and output valve bodies adjacent the respective electromagnets and respective magnetically attractable elements on the valves for urging one of the valves into its open position and for urging the other valve into its closed position;
   actuating means for electrically energizing the respective electromagnets to repel the respective permanent magnet and displace the valve body of the one valve into its closed position and the valve body of the other valve into its closed position; and
   control means for permitting flow for a limited period of time between the source and the load by first energizing the electromagnet of the normally closed other valve and thereby permitting flow through both valves, for thereafter energizing the electromagnet of the one normally open valve to close same, for thereafter deenergizing the electromagnet of the other normally closed valve to close same, and for thereafter deenergizing the electromagnet of the one normally open valve to open same.

2. The flow-control valve assembly defined in claim 1 wherein the electromagnets have substantially identical coils.

3. The flow-control valve assembly defined in claim 1 wherein the valve bodies are not magnetically attractable.

4. The flow-control valve assembly defined in claim 1 wherein the valve bodies are substantially identical.

5. A valve assembly for controlling fluid flow between a fluid source and a load, the assembly comprising:
   an intake valve having
      a valve body displaceable between a closed position preventing flow through the intake valve and an open position permitting such flow, and
      a electromagnet electrically energizable to move the valve body between its positions;
   an output valve having
      a valve body movable independently of the valve body of the intake valve and displaceable between a closed position preventing flow through the output valve and an open position permitting such flow, and
      an electromagnet independent of the electromagnet of the intake valve and energizable to move the valve body of the output valve between its positions;
   conduit means for connecting the valves in series between the load and the source, whereby fluid can only flow between the load and source when both of the valves are in their open positions;
   respective biasing means for urging one of the valves into its open position and for urging the other valve into its closed position;
   actuating means connected to the electromagnets for moving the one valve into its closed position and for moving the other valve into its open position; and
   control means for permitting flow for a limited period of time between the source and the load by first energizing the electromagnet of the normally closed other valve and thereby permitting flow through both valves, for thereafter energizing the electromagnet of the one normally open valve to close same, for thereafter deenergizing the electromagnet of the other normally closed valve to close same, and for thereafter deenergizing the electromagnet of the one normally open valve to open same.

6. The flow-control valve assembly defined in claim 5 wherein the valve bodies are slidable between their positions along a common axis.

7. The flow-control valve assembly defined in claim 5 wherein the valve bodies are valve spools.

8. The flow-control valve assembly defined in claim 5 wherein the valves are substantially identical.

9. The flow-control valve assembly defined in claim 5 wherein the valve bodies are at least partially magnetically attractable by the respective electromagnets, the biasing means including respective springs braced against the valve bodies.

10. The flow-control valve assembly defined in claim 5 wherein the biasing means includes respective permanent magnets carried on the valve bodies and respective magnetically attractable elements on the valves.

11. A method of controlling fluid flow between a fluid source and a load with an assembly comprising:
    an intake valve having
       a valve body displaceable between a closed position preventing flow through the intake valve and an open position permitting such flow, and
       a electromagnet electrically energizable to move the valve body between its positions;
    an output valve of substantially the same response time as the intake valve and having
       a valve body movable independently of the valve body of the intake valve and displaceable between a closed position preventing flow through the output valve and an open position permitting such flow, and an electromagnet independent of the electromagnet of the intake valve and energizable to move the valve body of the output valve between its positions;

conduit means for connecting the valves in series between the load and the source, whereby fluid can only flow between the load and source when both of the valves are in their open positions;

respective biasing means for urging one of the valves into its open positon and for urging the other valve into its closed position; and actuating means connected to the electromagnets for moving the one valve into its closed position and for moving the other valve into its open position;

the method comprising the steps of sequentially energizing the electromagnet of the normally closed other valve and thereby permitting flow through both valves, thereafter energizing the electromagnet of the one normally open valve to close same while maintaining energization of the other valve, thereafter deenergizing the electromagnet of the other normally closed valve to close same, and thereafter deenergizing the electromagnet of the one normally open valve to open same.

* * * * *